Patented Aug. 29, 1944

2,356,884

UNITED STATES PATENT OFFICE 2,356,884

MERCURATED ALIPHATIC AMINES

Anderson W. Ralston and Miles R. McCorkle, Chicago, Ill., assignors to Armour and Company, Chicago, Ill., a corporation of Illinois No Drawing. Application November 21, 1938, Serial No. 241,691

5 Claims. (Cl. 260—431)

This invention relates to mercurated aliphatic amines and it comprises aliphatic amines containing the linkage

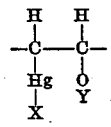

wherein X is an acid radical such as halogen, cyano, nitrate, acetate and the like, and Y is hydrogen or an alkyl group containing five or less carbon atoms; it further comprises processes wherein primary, secondary, or tertiary aliphatic amines containing at least one alkylene radical are reacted with a mercuric salt in the presence of water or an aliphatic alcohol, and it further comprises weed-killing compositions containing said mercurated amines.

Organic mercurials are substances of general interest and their synthesis from unsaturated aliphatic compounds is of some importance. High molecular weight aliphatic mercurials would find use as germicides, antiseptics, and as weed-killing compounds. Most high molecular weight aliphatic mercurials are soluble in organic solvents and insoluble in water. Solubility in oil is quite necessary for a number of uses, but a field exists for compounds of this nature which are both oil and water soluble.

We have now discovered a group of organic mercury-containing compounds which dissolve in most organic solvents but which possess the added advantage that their salts are appreciably soluble in water. These compounds are the mercurated aliphatic amines and they can be easily prepared from unsaturated aliphatic amines. These products are characterized by the presence of the group

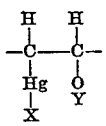

wherein X is an acid radical and Y is hydrogen or an alkyl group containing five or less carbon atoms. These compounds are generally heavy liquids or low-melting solids soluble in some organic solvents, and the salts of which have an appreciable water solubility.

Our mercurated amines are especially useful as weed-killers as we shall more fully describe hereinafter.

The following examples of typical compounds falling in the scope of our invention can be given:

EXAMPLE 1

*9-acetoxymercuri, 10-methoxyoctadecyl amine*

133 grams of 9-octadecenyl amine are placed in a three-necked flask and 180 grams of mercuric acetate and 400 cc. of methanol added. The mixture is refluxed for three hours with constant stirring. The reaction mixture is then filtered and diluted with water and the mixture made alkaline with potassium hydroxide solution. The product is then extracted with ether and the ether solution dried with anhydrous sodium sulfate. The ether is removed under a vacuum. The product is 9-acetoxymercuri, 10-methoxyoctadecyl amine or its isomer. This product is soluble in ether but only slightly soluble in alcohol and kerosene. The acetate salt can be prepared by reacting the amine with acetic acid. The acetate is a low-melting solid which is soluble in water and slightly soluble in organic solvents.

EXAMPLE 2

*9,9'-diacetoxymercuri, 10,10'-dimethoxy-dioctadecyl amine*

130 grams of 9,9'-dioctadecenyl amine are placed in a three-necked flask and mixed with 400 cc. of methanol and 360 grams of mercuric acetate. The mixture is refluxed with constant stirring for ten hours. Water is then poured into the mixture and after cooling, the product is extracted with ether. The ether solution is washed with water and dried with anhydrous sodium sulfate. The product is a heavy, low-melting solid and analysis shows it to be 9,9'-diacetoxymercuri, 10,10'-dimethoxydioctadecyl amine. It is soluble in ether and hot alcohol. Its acetate is somewhat soluble in water.

EXAMPLE 3

*9-chloromercuri, 10-ethoxyoctadecyl amine*

133 grams of 9-octadecenyl amine are placed in a three-necked flask and 150 grams of mercuric chloride and 400 cc. of ethanol added. The mixture is refluxed for ten hours with constant stirring. The reaction mixture is then diluted with water and extracted with ether. The ether solution is washed with water until the washings give no test for mercury. The ether solution is then dried with anhydrous sodium sulfate and the ether removed by distillation. Analysis shows the product to be 9-chloromercuri, 10-ethoxyoctadecyl amine or an isomer. This product is a heavy liquid which is soluble in ether, carbon tetrachloride, and alcohols, and insoluble in water. The salts, such as the acetate or hydrochloride, are appreciably water soluble.

EXAMPLE 4

*1-acetoxymercuri, 2-methoxyundecyl amine*

169 grams of 1-undecenyl amine are mixed with 349 grams of mercuric acetate and 400 cc. of methanol. The mixture is refluxed for ten hours with constant stirring. Water is then added and the product extracted with ether. The ether solution is dried and the ether evaporated. The product is a low-melting solid soluble in organic solvents, and analysis shows it to be 1-acetoxymercuri, 2-methoxyundecyl amine. The salts possess an appreciable water solubility.

EXAMPLE 5

100 grams of unsaturated amines are prepared by reduction, with metallic sodium, of nitriles obtained from fish oil fatty acids. These amines are mixed with 125 grams of mercuric acetate and 250 cc. of butyl alcohol. The mixture is heated over a steam bath with constant stirring for ten hours. The reaction mixture is then filtered and the butyl alcohol removed under reduced pressure. The product is dissolved in ether and the ether solution washed with water. The solution is dried with anhydrous sodium sulfate, filtered, and the ether removed. The product, which is a pasty solid, weighs 198 grams. Analysis indicates it to contain approximately one equivalent of mercury and one double bond per molecule.

In the examples given above, all of the mercurated aliphatic amines are characterized by the presence of the group

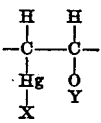

wherein X is an acid radical and Y is hydrogen or an alkyl group containing five or less carbon atoms. The general reaction for their preparation is as follows:

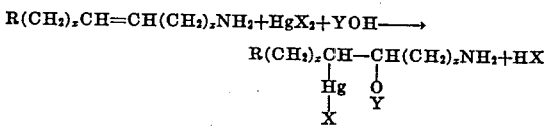

X may be any acid radical and a number of typical examples have been chosen. Thus X may be

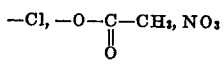

etc. Y may be hydrogen or an alkyl group containing five or less carbon atoms. Thus if the reaction is conducted in water the group OY will be hydroxyl, and if the reaction is conducted in butyl alcohol the group OY will be butoxy.

These compounds are all soluble in organic solvents such as ether, alcohol, etc. They are insoluble in water but their salts, such as the acetates, hydrochlorides, and thiocyanates, are appreciably water soluble.

We have discovered that these mercurated aliphatic amines are powerful herbicides and that they possess a preferential killing power for weeds in the presence of grass. We have found that it is possible to treat lawns containing weeds with the proper concentration of these mercurated aliphatic amines so that the weeds are completely removed and the grass is not permanently injured. We have been able to prepare spraying compositions in which they are the active ingredient by using solutions of the mercurated amines in hydrocarbon solvents. Satisfactory results have also been obtained by the use of water solutions of their salts. In both cases we have found that concentrations of the order of 0.5% are effective, although we have obtained satisfactory results with both higher and lower percentages. Generally it is not advisable to use concentrations higher than 1.0% unless an over-all killing of all plant growth is desired. We attribute the selective killing power exhibited by these compounds to the fact that the weed roots, being of a different structure from the grass roots, specifically absorb the compounds. We do not believe this to be qualitative, but rather a quantitative destruction; however, we do know that the spraying of controlled amounts over areas containing both weeds and grass indicates that substantially all of the mercurial is absorbed by the root systems of the weeds. The so-called "crab grass" is much less resistant than other grasses and it is possible to effectively control it by the use of these mercurated amines.

When preparing our mercurated amines we can start with any aliphatic amine, whether it be primary, secondary or tertiary, so long as at least one of the hydrocarbon radicals contains a double bond. In general we start with amines having at least ten carbon atoms in at least one of the alkyl groups. When the starting amine contains two alkylated groups we can introduce two of the linkages

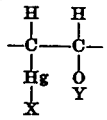

by using sufficient reactants to accomplish this. Or we can restrict the degree of mercuration so that only one of such linkages is introduced.

Having thus described our invention, what we claim is:

1. Mercurated aliphatic amines containing at least ten carbon atoms in at least one of the alkyl groups and characterized by the presence of at least one

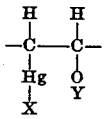

group in the molecule, wherein X is an acid radical whose mercuric salt is soluble in a solvent chosen from one of the group consisting of water and alcohol and Y is one of the group consisting of hydrogen and an alkyl group containing not more than 5 carbon atoms; and salts of such mercurated amines.

2. Mercurated aliphatic amines containing eighteen carbon atoms in at least one of the alkyl groups and characterized by the presence of at least one

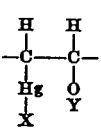

group in the molecule, wherein X is an acid radical whose mercuric salt is soluble in a solvent chosen from one of the group consisting of water and alcohol and Y is one of the group consisting of hydrogen and an alkyl group containing not more than five carbon atoms; and salts of such mercurated amines.

3. 9 - acetoxymercuri, 10 - methoxyoctadecyl amine.

4. 9,9'- diacetoxymercuri, 10,10'- dimethoxydioctadecyl amine.

5. 9-chloromercuri, 10-ethoxyoctadecyl amine.

ANDERSON W. RALSTON.
MILES R. McCORKLE.